(12) United States Patent
Burnett et al.

(10) Patent No.: US 6,517,314 B1
(45) Date of Patent: Feb. 11, 2003

(54) METHOD AND APPARATUS FOR ELIMINATING THERMAL BOWING AND AXIAL THRUST LOADS OF STEAM TURBINE ROTORS

(75) Inventors: Mark Edward Burnett, Buskirk, NY (US); Norman Arnold Turnquist, Sloansville, NY (US); Christopher Edward Wolfe, Niskayuna, NY (US); Bruce William Brisson, Galway, NY (US); Fredrick George Baily, Ballston Spa, NY (US); David Alan Caruso, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/985,638

(22) Filed: Nov. 5, 2001

(51) Int. Cl.[7] ................................................ F01D 11/00
(52) U.S. Cl. ..................................... 415/173.7; 415/230
(58) Field of Search ........................... 415/173.5, 173.6, 415/173.7, 174.5, 230; 277/355

(56) References Cited

U.S. PATENT DOCUMENTS

| | | | | |
|---|---|---|---|---|
| 5,522,698 A | * | 6/1996 | Butler et al. ................. 277/355 |
| 5,531,569 A | * | 7/1996 | Seeley ..................... 416/219 R |
| 5,704,760 A | * | 1/1998 | Bouchard et al. ........... 277/355 |
| 5,961,279 A | * | 10/1999 | Ingistov ............... 415/173.1 X |
| 6,168,377 B1 | | 1/2001 | Wolfe et al. ............. 415/174.2 |
| 6,183,193 B1 | * | 2/2001 | Glasspoole et al. ......... 415/115 |
| 6,220,814 B1 | * | 4/2001 | Brushwood et al. ........ 219/201 |
| 6,390,476 B1 | * | 5/2002 | Tong et al. ................. 277/355 |

* cited by examiner

Primary Examiner—Edward K. Look
Assistant Examiner—Kimya N McCoy
(74) Attorney, Agent, or Firm—Nixon & Vanderhye

(57) ABSTRACT

In a steam turbine, a combined brush and labyrinth seal is provided between a diaphragm web and axial projecting platforms on bucket dovetails at a location spaced radially outwardly of the outer diameter of the rotor. The downstream axially adjacent bucket dovetails also have platforms serving as complementary sealing surfaces to labyrinth teeth formed on the web. By locating the combined labyrinth and brush seal radially outwardly of the outer diameter of the shaft, thermal bowing of the rotor is eliminated. By providing backup labyrinth seals at the same radial location, axial thrust loads are eliminated in the event of brush seal failure.

8 Claims, 2 Drawing Sheets

METHOD AND APPARATUS FOR ELIMINATING THERMAL BOWING AND AXIAL THRUST LOADS OF STEAM TURBINE ROTORS

BACKGROUND OF THE INVENTION

The present invention relates to a steam turbine having brush seals between non-rotatable and rotatable components arranged and located to eliminate thermal bowing resulting from non-uniform distribution of heat about the rotatable component due to frictional contact between the brush seal and the rotatable component and particularly relates to apparatus and methods for eliminating axial thrust loads in the event of failure of the brush seal in such turbine.

In U.S. Pat. No. 6,168,377, of common assignee herewith, there is disclosed a steam turbine having a brush seal located between a non-rotatable component and a rotatable component of the rotor shaft. Particularly, axial flanges are provided on the dovetails of the buckets, the bucket dovetails being secured in complementary fashion to the dovetail of a rotor wheel. A brush seal comprised of an arcuate array of metal bristles projecting from the non-rotatable component toward the rotatable component, i.e., the flanges on the bucket dovetails, has bristle tips engaging with and bearing against the flange surfaces. As will be appreciated from a review of that patent, the contact between the bristles of the brush seal and the opposing sealing surface, i.e., the flanges, generates heat.

As disclosed in that patent, it was recognized that the contact between the brush seal and the sealing surface should be located radially outwardly of the rotor shaft in order to isolate the generated heat from the outer diameter of the rotor. Otherwise, the friction-generated heat may cause a non-uniform temperature distribution about the circumference of the shaft, resulting in non-uniform axial expansion of the rotor and, hence, a bow in the rotor. While various methods and apparatus are disclosed in that patent for eliminating that problem, one such solution located the friction-generating surface on the bucket dovetail flanges radially outboard of the outer shaft diameter. In that manner, the generated heat is isolated from the rotor, eliminating any tendency of the rotor to bow.

That patented design and other designs utilize conventional labyrinth-type packing seals on the inside of the diaphragm web as a backup to the brush seal. These labyrinth seals are located directly adjacent the outer diameter of the shaft. Brush seals are, however, susceptible to wear and failure. Should a brush seal spaced outwardly from the shaft fail, e.g., the brush seal of that patented design, the sealing diameter changes from the bucket dovetail platform to the rotor shaft. This, in turn, adversely changes the pressure distribution on the shaft and the thrust on the rotor in an axial direction. Accordingly, there is a need to provide a sealing system for a steam turbine in which not only is the problem of thermal bowing of the steam turbine rotor due to non-uniform heat distribution resulting from contact between brush seals and complementary sealing surfaces eliminated, but also the axial thrust loads on the rotor bearings are eliminated or minimized in the event of brush seal failure.

BRIEF SUMMARY OF THE INVENTION

In accordance with a preferred embodiment of the present invention, there is provided a brush seal located radially outwardly of the outer diameter of the shaft of the rotatable component to eliminate thermal bowing of the rotor due to non-uniform heat distribution in combination with a labyrinth seal at substantially the same radial location to eliminate thrust loads in the event of failure of the brush seal. In this connection, the areas of axially opposed bucket dovetails defining axially opposite sides of the wheelspace between adjacent bucket wheels are substantially the same. The axially opposed adjacent bucket dovetails have axially extending platforms projecting from the bucket dovetails. The brush seal is located preferably on the downstream platforms of adjacent bucket stages with bristles projecting radially inwardly from the inner diameter of the diaphragm web. A pair of labyrinth teeth are similarly located on the upstream side of the web behind the brush seal. On the downstream side of the diaphragm web, a labyrinth seal is also provided with the axially projecting platforms of the axially adjacent buckets of the next adjacent downstream stage. The wheelspaces between the buckets are therefore generally symmetrical in a circumferential direction.

Should the brush seal fail, the labyrinth seals in these locations limit the performance degradation. The substantially equal axially opposed areas of the bucket dovetails also assist to prevent a change in rotor thrust from occurring. That is, since the areas of the upstream and downstream rotor surfaces exposed in the cavity inwardly of the diaphragm, i.e., the wheelspaces, are substantially equal, no net axial thrust from leakage flows past the labyrinth seal occurs. The platforms radially spaced from the rotor shaft thus provide sufficient heat dissipation to prevent induced heating from adversely affecting rotor vibrational performance, while the labyrinth seals in combination with the brush seals at substantially the same radial locations minimize or eliminate axial thrust loads in the event of brush seal failure.

In a preferred embodiment according to the present invention, a steam turbine comprising a rotatable component including a rotor shaft and a non-rotatable component about the rotatable component, a brush seal carried by the non-rotatable component for sealing engagement with the rotatable component, the rotatable component including a plurality of buckets having bucket dovetails for connection with complementary dovetails on a wheel of the rotatable component, means for inhibiting non-uniform circumferential heat transfer to the rotatable component thereby to eliminate or minimize bow of the rotatable component due to frictional contact between the brush seal and rotatable component, the inhibiting means including an axially extending platform on each the bucket dovetail in frictional engagement with the brush seal at a location spaced radially outwardly of an outer diameter of the rotor shaft, and a labyrinth seal carried by the non-rotatable component including at least one tooth extending between the non-rotatable component and the platform spaced generally radially outwardly from an outer diameter of the rotor shaft.

In a further preferred embodiment according to the present invention, there is a steam turbine comprising a rotatable shaft including a plurality of circumferentially spaced buckets at each of axially spaced locations therealong forming the buckets of adjacent stages of the turbine, a plurality of non-rotating partitions between the buckets of the adjacent stages including inner webs extending radially inwardly of a steam flowpath through the buckets and partitions, the buckets having bucket dovetails for connecting with complementary dovetails on wheels of the shaft, a brush seal carried by the inner webs, means for inhibiting non-uniform circumferential heat transfer to the rotatable shaft thereby to eliminate or minimize bow of the rotatable shaft due to frictional contact between the brush seal and rotatable shaft, the inhibiting means including a platform extending axially from each the bucket dovetail with portions of the platform lying radially inwardly of the inner webs and in radial alignment with portions of the inner webs, the brush seal extending from the inner web portions in frictional engagement with the platform portions in radial alignment therewith and at a location spaced radially outwardly of an outer diameter of the rotatable shaft, and a labyrinth seal carried by the inner web including at least one tooth extending between the inner web portions and the platform portions and spaced generally radially outwardly from an outer diameter of the rotor shaft.

DETAILED DESCRIPTION OF THE INVENTION

Figure 1:
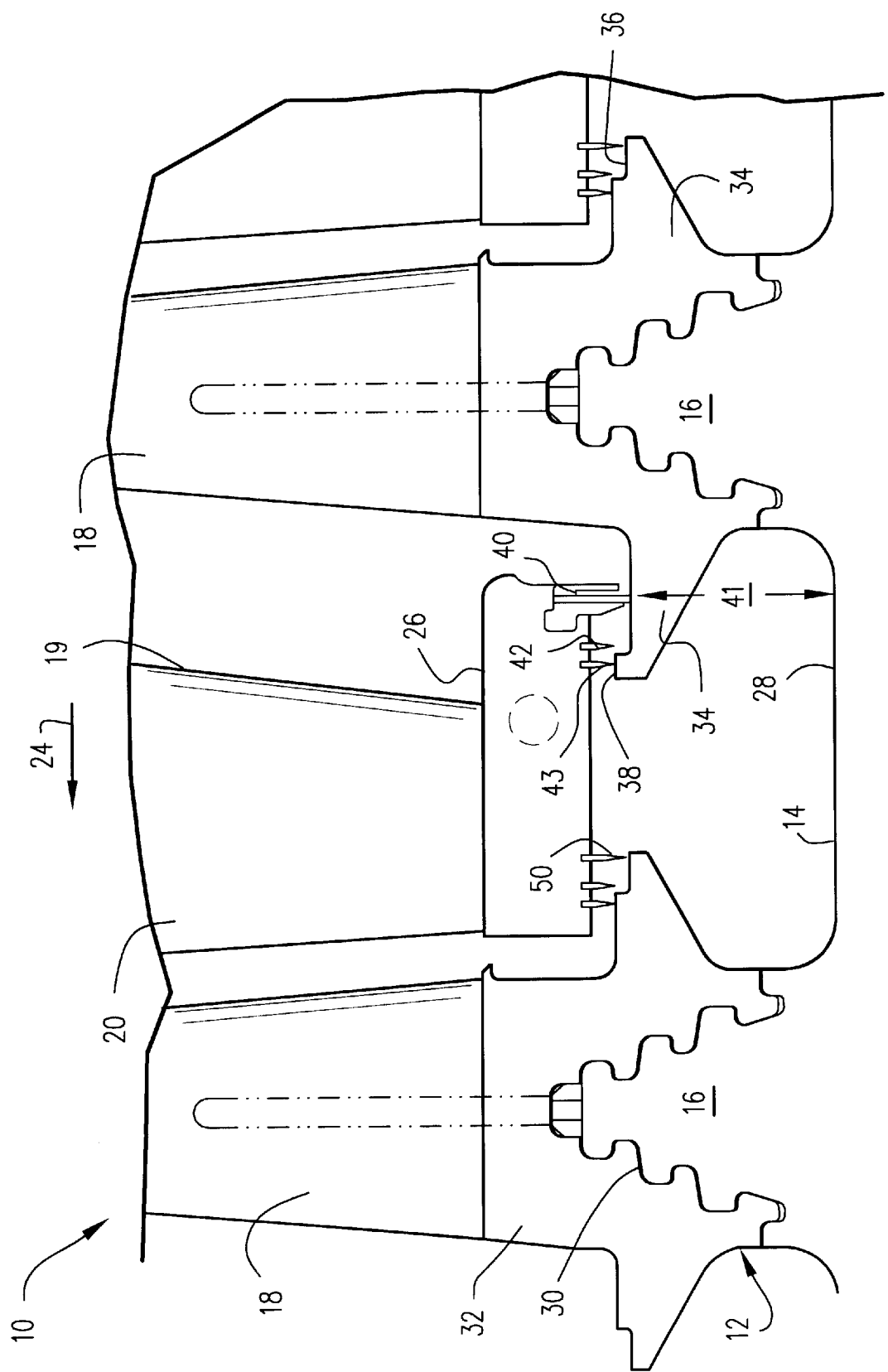
FIG. 1 is a schematic cross-sectional view of a portion of a steam turbine illustrating turbine buckets and diaphragms along the turbine shaft and the locations of the combined brush/labyrinth seals.

Referring to FIG. 1, there is illustrated a steam turbine, generally designated 10, having a rotatable component, generally designated 12, including a rotor shaft 14 mounting a plurality of axially spaced wheels 16, in turn mounting steam turbine buckets 18. Between axially adjacent buckets, there is a non-rotatable component 19 comprised of a series of nozzle partitions 20 and which partitions, together with the buckets 18, form a steam flow path through the steam turbine, generally in the direction of the arrow 24. The partitions 20 are attached to an inner web 26 radially spaced from the outer diameter 28 of the rotor shaft 14, the partitions 20 and the web 26 jointly forming a diaphragm. It will be appreciated that the rotor shaft 14 is a continuous, solid, elongated metal piece.

As illustrated in FIG. 1, the wheels have a circumferentially extending dovetails 30 and each of the buckets 18 includes a complementary-shaped dovetail 32. It will be appreciated that the buckets are applied to the wheels in a circumferential direction. As illustrated in FIG. 1 and except between end stages of the turbine, the axial faces of the bucket dovetails are substantially equal in area and have platforms or flanges 34 extending axially from the bucket dovetails 32 in opposite axial directions. The only difference in the symmetry of the intermediate bucket dovetails lies in the tips of the platforms 34. On the upstream side of each bucket, the tip of the platform 34 has a recess 36, while on the downstream side, the tip of the platform has a radial outward projection 38. However, the projected axial areas of the bucket dovetails of adjacent stages are substantially equal.

Figure 2:
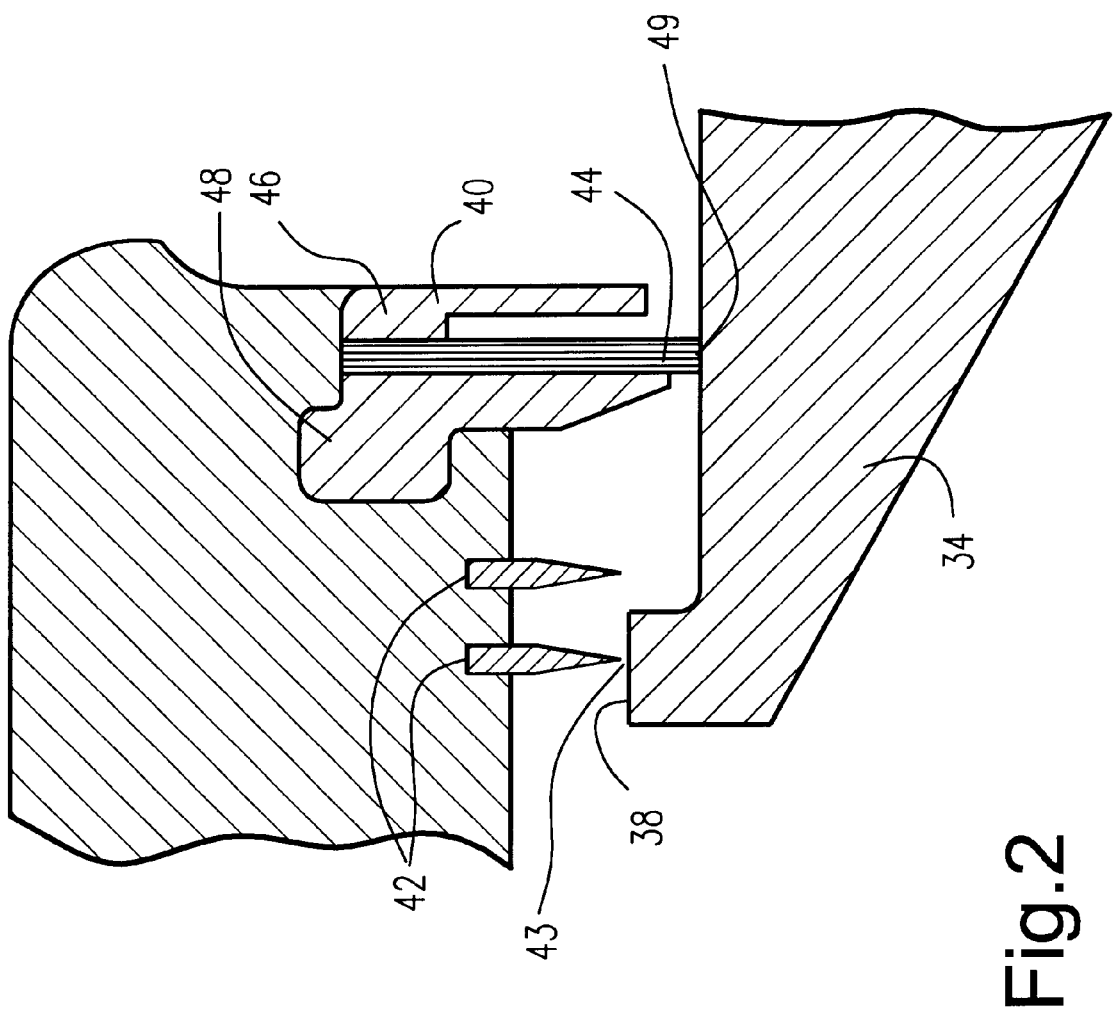
FIG. 2 is an enlarged fragmentary cross-sectional view illustrating a combined brush and labyrinth seal hereof.

In accordance with a preferred embodiment of the present invention, a combined brush seal and labyrinth seal are provided between the non-rotatable component, i.e., the partitions 20 and web 26, and the rotatable component, i.e., the platforms on the bucket dovetails 32. Particularly, a brush seal 40 is located on the upstream side of each of the webs 26 between adjacent bucket wheels 16, in combination with a labyrinth seal 42. The brush seal 40, as best illustrated in FIG. 2, includes a plurality of preferably metal bristles 44 arranged in an arcuate array and engaged between a forward plate 46 and a backing plate 48. Bristles 44 project radially inwardly of the inner edges of the backing plates and have tips 49 which engage the circumferentially extending surfaces of the platforms 34. The engagement between the bristles and the platforms 34 form a brush seal. It will be appreciated that the contact between the bristle tips 49 and the platforms 34 generates heat, which may be non-circumferentially uniformly distributed about the platform. However, as in the prior U.S. Pat. No. 6,168,377, the non-uniform distribution of generated heat does not result in a bowing of the rotor because the location of the generated heat is radially outboard of the shaft 14.

Axially behind and substantially at the same radial location of the brush seal are a pair of labyrinth teeth 42 forming a labyrinth seal 43. The labyrinth teeth 42 comprise radially inwardly directed teeth having tapered ends which form a tortuous labyrinth sealing path with the adjacent surfaces of the platform 34. Thus, the labyrinth seal 43 essentially backs up the brush seal 40. On the downstream side of the web 26, a labyrinth seal is also provided and comprises a plurality of labyrinth teeth 50. Teeth 50, similar to teeth 42, form a tortuous labyrinth seal with the radially registering surface of the axially registering platform 34 of the next axially downstream bucket dovetail 32. From a review of FIG. 1, it will be appreciated that the opposed projected axial areas of the wheelspace radially inwardly of the web 26 and between adjacent stages of the buckets are essentially equal to one another.

It will be appreciated that the seals at opposite axial sides of the web 26 prevent or minimize the formation of leakage paths between adjacent stages. Because the sealing capacity of a brush seal is considerably superior to that of labyrinth seals, the main seal between the illustrated stages is manifested by the brush seal 40. The brush seal 40 affords the added advantage that, because of its radial location, the heat generated by the contact of the brush bristles and the platform 34 does not result in thermal bowing of the rotor. That is, the location of the brush seal radially outwardly of the shaft a distance indicated 41 in FIG. 1 constitutes a means for inhibiting non-uniform circumferential heat transfer to the shaft thereby eliminating or minimizing bow of the shaft due to frictional contact between the brush seal and the shaft. Should the brush seal 40 fail, however, the labyrinth seals 43 and 50 compensate for the loss of sealing capacity of the brush seal. In essence, the labyrinth teeth serve as backup seals in the event of a brush seal failure. By preventing the sealing from reverting to a location radially inwardly of the location of the brush seals, as is typical of packing seals, not only is thermal bowing precluded but axial thrust loads as a result of brush seal failure are prevented. Additionally, the substantially equal axial areas of adjacent bucket dovetails defining the wheelspace between adjacent buckets radially inwardly of the webs assists to prevent axial thrust loads should leakage flow pass into, the wheelspace. That is, the pressure distribution in the wheelspace cavity does not change if the brush seal fails and this precludes axial thrust loads resulting from leakage flows past the backup labyrinth seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam turbine comprising:

a rotatable component including a rotor shaft and a non-rotatable component about said rotatable component;

a brush seal carried by said non-rotatable component for sealing engagement with the rotatable component;

said rotatable component including a plurality of buckets having bucket dovetails for connection with complementary dovetails on a wheel of said rotatable component;

means for inhibiting non-uniform circumferential heat transfer to the rotatable component thereby to eliminate or minimize bow of the rotatable component due to frictional contact between the brush seal and rotatable component;

said inhibiting means including an axially extending platform on each said bucket dovetail in frictional engagement with said brush seal at a location spaced radially outwardly of an outer diameter of the rotor shaft; and a labyrinth seal carried by said non-rotatable component including at least one tooth extending between said non-rotatable component and said platform spaced generally radially outwardly from an outer diameter of said rotor shaft.

2. A turbine according to claim 1 wherein said non-rotatable component has a diaphragm with an inner web spaced radially outwards of said rotor shaft, portions of said platforms extending radially inwardly of and in radial alignment with portions of said webs, said brush seal and said labyrinth seal extending between said portions of said web and said platforms.

3. A turbine according to claim 2 wherein said shaft is spaced radially inwardly of the platforms, the web of the non-rotatable component and said dovetails of said rotatable component.

4. A turbine according to claim 2 including a second wheel on said rotatable component mounting buckets having bucket dovetails for connection with complementary dovetails on said second wheel of said rotatable component and forming a portion of a downstream stage of the turbine axially adjacent the first mentioned buckets, said platforms on buckets of adjacent stages lying in axial alignment with one another and along respective upstream and downstream portions of each bucket, said brush seal and said labyrinth tooth being located in sealing relation to said downstream platforms, said diaphragm including partitions carrying said web between the buckets of axially adjacent stages, said labyrinth seal including a second labyrinth tooth carried by said web for sealing with the upstream platforms of the buckets at the second stage thereof at a radial location spaced outwardly of the outer diameter of the rotor shaft and generally corresponding to the radial distance of the brush seal engagement with the downstream platforms from the outer diameter of the rotor shaft, whereby, upon failure of the brush seal, sealing effectiveness is maintained at locations radially outwardly of said shaft.

5. A turbine according to claim 2 wherein said platforms on buckets of adjacent stages lie in axial opposition with one another, said web having axially spaced portions lying in spaced radial registration with tip portions of the platforms, respectively, of the buckets of adjacent stages, said brush seal extending between one of said axially spaced portions of said web and one of the tip portions of the platforms, said one tooth extending between said one axially spaced portion of said web and said one of the tip portions of the platforms, said labyrinth seal including another tooth extending between another of said axially spaced portions of said web and another of the tip portions of the platforms.

6. A turbine according to claim 1 wherein the bucket dovetails of adjacent stages lie in axial opposition with one another and have substantially equal areas in axial opposition to one another thereby eliminating or minimizing any net axial thrust.

7. A steam turbine comprising:
a rotatable shaft including a plurality of circumferentially spaced buckets at each of axially spaced locations therealong forming the buckets of adjacent stages of the turbine;

a plurality of non-rotating partitions between the buckets of said adjacent stages including inner webs extending radially inwardly of a steam flowpath through the buckets and partitions;

said buckets having bucket dovetails for connecting with complementary dovetails on wheels of said shaft;

a brush seal carried by said inner webs;

means for inhibiting non-uniform circumferential heat transfer to the rotatable shaft thereby to eliminate or minimize bow of the rotatable shaft due to frictional contact between the brush seal and rotatable shaft;

said inhibiting means including a platform extending axially from each said bucket dovetail with portions of said platform lying radially inwardly of said inner webs and in radial alignment with portions of said inner webs, said brush seal extending from said inner web portions in frictional engagement with said platform portions in radial alignment therewith and at a location spaced radially outwardly of an outer diameter of said rotatable shaft; and a labyrinth seal carried by said inner web including at least one tooth extending between said inner web portions and said platform portions and spaced generally radially outwardly from an outer diameter of said rotor shaft.

8. A steam turbine as in claim 7 wherein axially opposed faces of the bucket dovetails defining a wheelspace therebetween are substantially equal in area to one another whereby axial thrust loads on the rotatable shaft are eliminated in the event of failure of the brush seal.

* * * * *